United States Patent
Lee

(10) Patent No.: US 6,698,060 B1
(45) Date of Patent: Mar. 2, 2004

(54) CASTER STRUCTURE

(75) Inventor: Yu Wen Lee, Chang Hua Hsien (TW)

(73) Assignee: Hando Industrial Co., Ltd., Chang Hua Hsien (TW)

( * ) Notice: Subject to any disclaimer, the term of this patent is extended or adjusted under 35 U.S.C. 154(b) by 0 days.

(21) Appl. No.: 10/165,798

(22) Filed: Jun. 10, 2002

(51) Int. Cl.⁷ .............................................. B60B 33/00
(52) U.S. Cl. ............................................... 16/20; 16/48
(58) Field of Search ............................. 16/20, 48, 21, 16/22, 23, 27, 18 R

(56) References Cited

U.S. PATENT DOCUMENTS

| | | | | |
|---|---|---|---|---|
| 1,576,923 A | * | 3/1926 | Malloy ........................... | 16/20 |
| 4,323,979 A | * | 4/1982 | Johnston ..................... | 361/684 |
| 4,649,461 A | * | 3/1987 | Matsuta ....................... | 361/799 |
| 4,833,554 A | * | 5/1989 | Dalziel et al. ........... | 360/98.04 |
| 4,926,291 A | * | 5/1990 | Sarraf ......................... | 361/685 |
| 5,041,924 A | * | 8/1991 | Blackborow et al. ......... | 360/69 |
| 5,199,131 A | * | 4/1993 | Harris ........................... | 16/21 |
| 5,206,796 A | * | 4/1993 | Thompson et al. ......... | 361/818 |
| 5,214,567 A | * | 5/1993 | Feightner et al. ........... | 361/685 |
| 5,258,888 A | * | 11/1993 | Korinsky et al. ........... | 361/704 |
| 5,287,594 A | * | 2/1994 | Hicks ........................... | 16/20 |
| 5,388,030 A | * | 2/1995 | Gasser et al. ............... | 361/818 |
| 5,459,640 A | * | 10/1995 | Moutrie et al. ............. | 361/707 |
| 5,548,480 A | * | 8/1996 | Rudi et al. ................... | 361/685 |
| 5,604,662 A | * | 2/1997 | Anderson et al. ........... | 361/685 |
| 5,652,697 A | * | 7/1997 | Le ............................... | 361/788 |
| 5,726,864 A | * | 3/1998 | Copeland et al. ........... | 361/800 |
| 5,740,019 A | * | 4/1998 | Lee ............................... | 361/759 |
| 5,813,090 A | * | 9/1998 | Miles ............................. | 16/37 |
| 5,886,869 A | * | 3/1999 | Fussell et al. ............... | 361/685 |
| 6,053,771 A | * | 4/2000 | Hood, III et al. ........... | 439/607 |
| 6,088,231 A | * | 7/2000 | Fajardo ....................... | 361/737 |
| 6,122,178 A | * | 9/2000 | Andrews et al. ............ | 361/800 |
| 6,188,571 B1 | * | 2/2001 | Roganti et al. ............. | 361/685 |
| 6,206,728 B1 | * | 3/2001 | Krehbiel et al. ............ | 439/607 |
| 6,219,239 B1 | * | 4/2001 | Mellberg et al. ............ | 361/704 |
| 6,236,574 B1 | * | 5/2001 | Han ............................. | 361/816 |
| 6,295,567 B1 | * | 9/2001 | Bassman et al. ............ | 710/104 |
| 6,442,020 B1 | * | 8/2002 | Liu et al. ..................... | 361/683 |
| 6,462,958 B2 | * | 10/2002 | Ogata ......................... | 361/800 |
| 6,512,671 B1 | * | 1/2003 | Okano et al. ............... | 361/686 |
| 6,560,097 B2 | * | 5/2003 | Naruo et al. ................ | 361/685 |
| 6,567,360 B1 | * | 5/2003 | Kagawa ..................... | 369/75.1 |
| 2002/0004968 A1 | * | 1/2002 | Yeh .............................. | 16/48 |

FOREIGN PATENT DOCUMENTS

| EP | 145795 A1 | * | 6/1985 | ........... B60B/33/00 |
|---|---|---|---|---|
| JP | 52002938 A | * | 1/1977 | ........... B60B/33/02 |

* cited by examiner

*Primary Examiner*—Anthony Knight
*Assistant Examiner*—Christopher Boswell
(74) *Attorney, Agent, or Firm*—Harrison & Egbert

(57) ABSTRACT

A caster structure comprises a small wheel, a mounting plate, a roller bearing, a wheel frame, and a locating member. The wheel is fastened pivotally with the wheel frame which is fastened with the underside of the mounting plate by the locating member in conjunction with the roller bearing. The locating member is provided with a plurality of rollers. The rollers of the locating member and the rollers of the roller bearing move to reduce friction at such time when the wheel is turned in a direction.

2 Claims, 4 Drawing Sheets

CASTER STRUCTURE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to the accessories of a piece of furniture or other object, and more particularly to a caster structure attached to the furniture or object so that it can be moved easily.

BACKGROUND OF THE INVENTION

The conventional caster structure comprises a small wheel, which is mounted in a wheel frame in conjunction with a metal ball bearing and a bolt. The metal ball bearing is apt to rust. As a result, the wheel makes noise when it turns. Even though this situation can be overcome by lubricant, it is by no means a satisfactory solution. Moreover, the lubricant is messy.

BRIEF SUMMARY OF THE INVENTION

The primary objective of the present invention is to provide a caster structure free of the deficiency of the conventional caster structure described above.

In keeping with the principle of the present invention, the foregoing objective of the present invention is attained by the caster structure comprising a wheel mounted in a wheel frame which is fastened to a mounting plate in conjunction with a roller bearing of an industrial rubber or plastic material.

The features and the advantages of the present invention will be more readily understood upon a thoughtful deliberation of the following detailed description of the present invention with reference to the accompanying drawings.

DETAILED DESCRIPTION OF THE INVENTION

Figure 1:
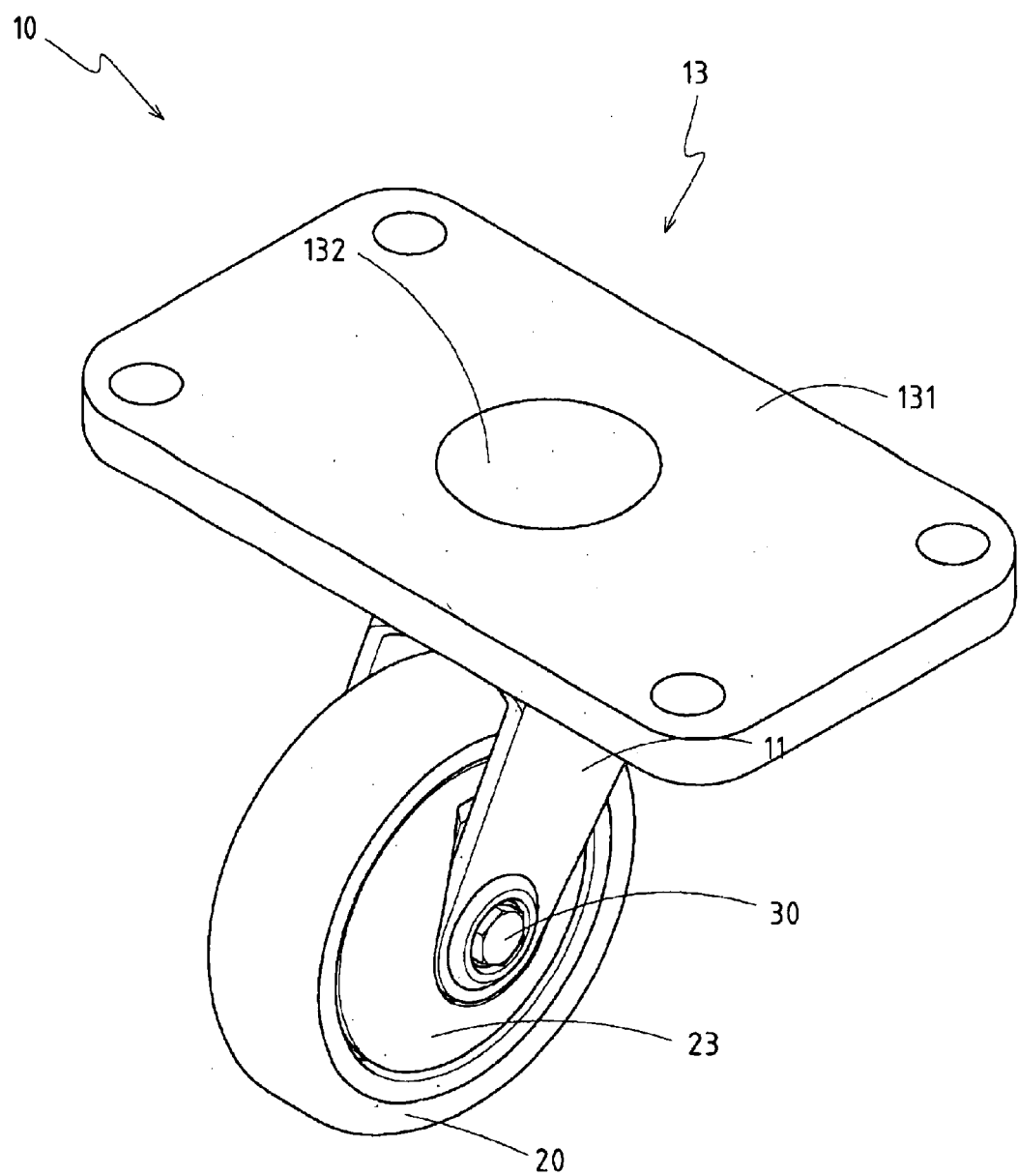
FIG. 1 shows a perspective view of the present invention.
Figure 2:
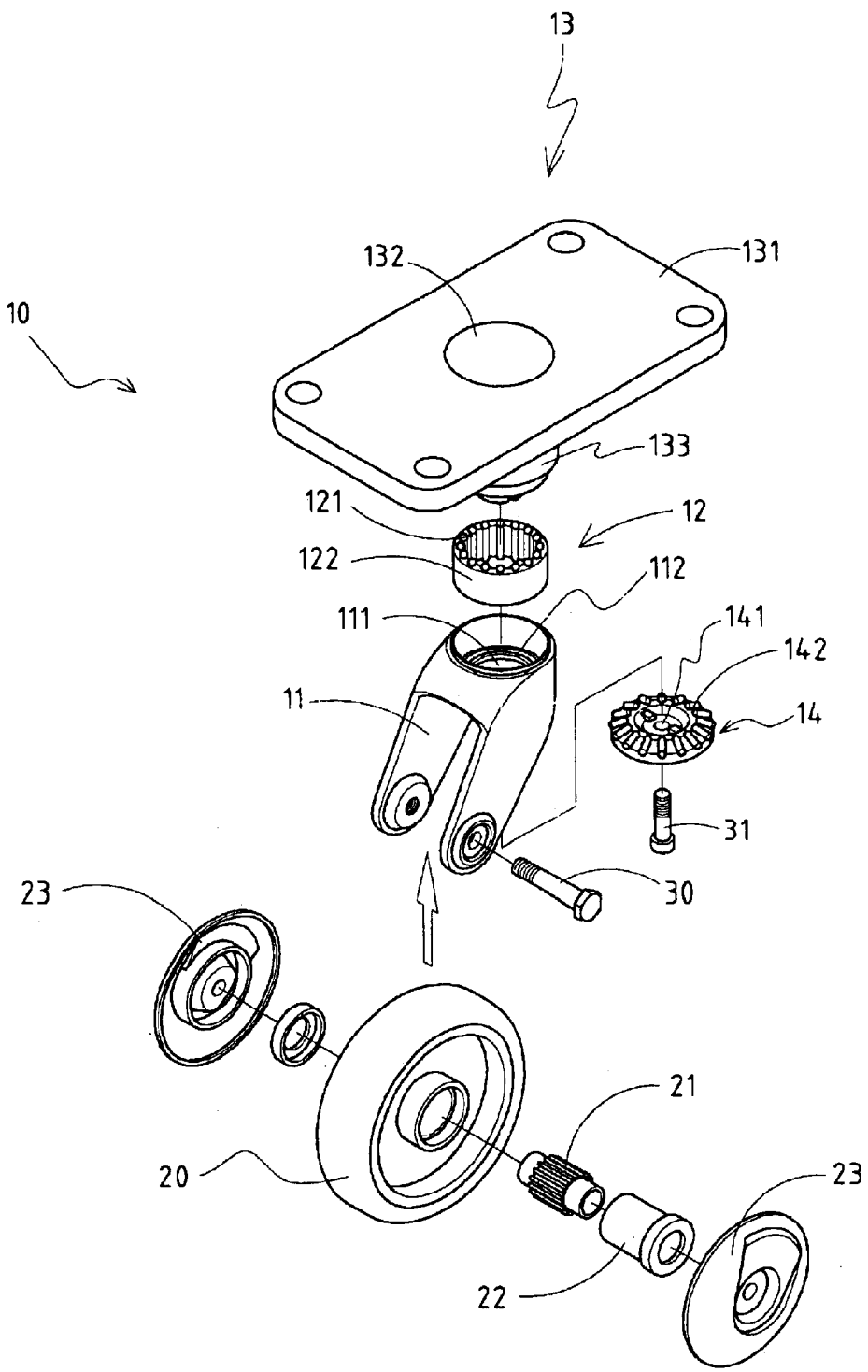
FIG. 2 shows an exploded view of the present invention.
Figure 3:
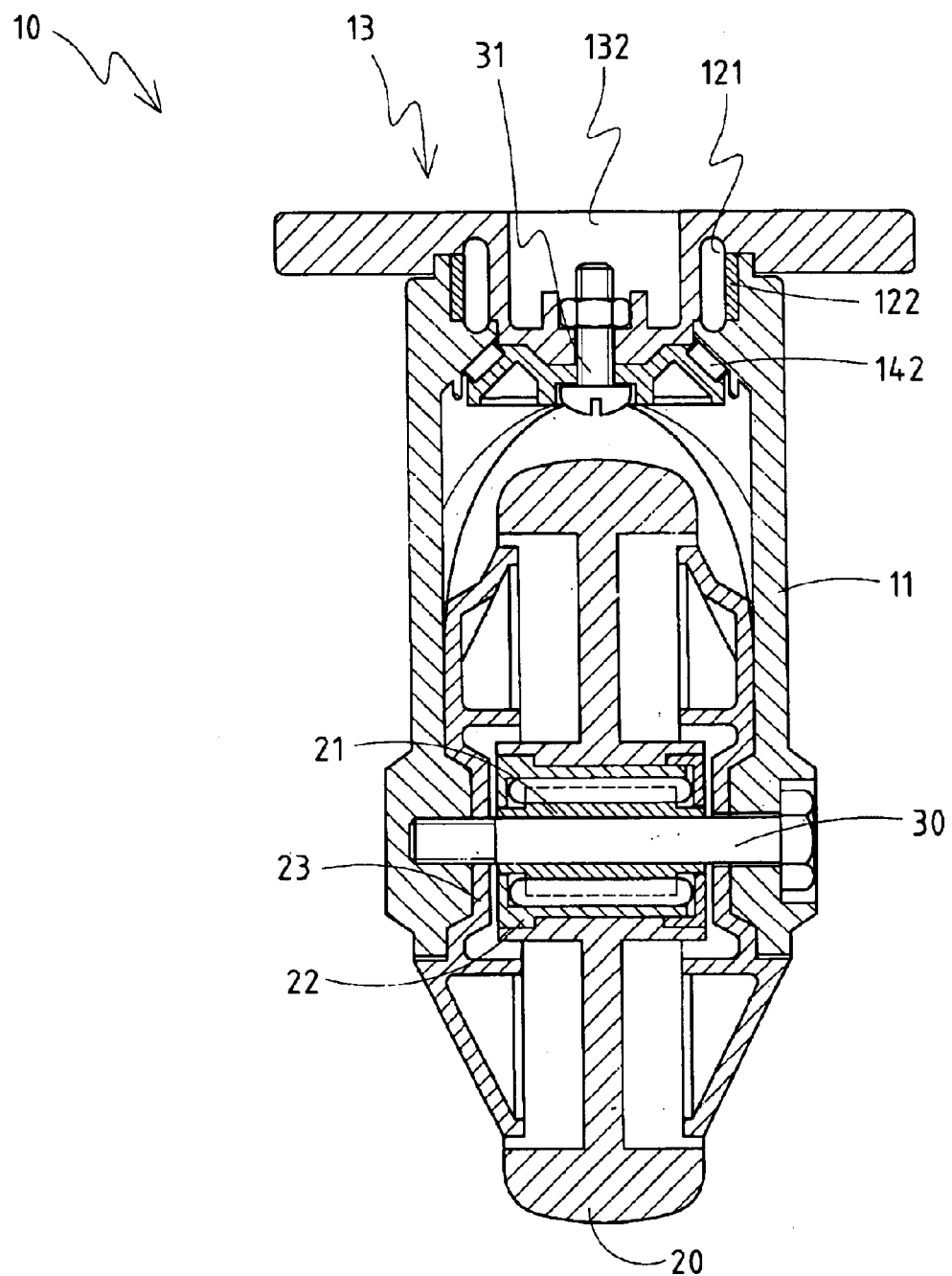
FIG. 3 shows a sectional view of the present invention in combination.
Figure 4:
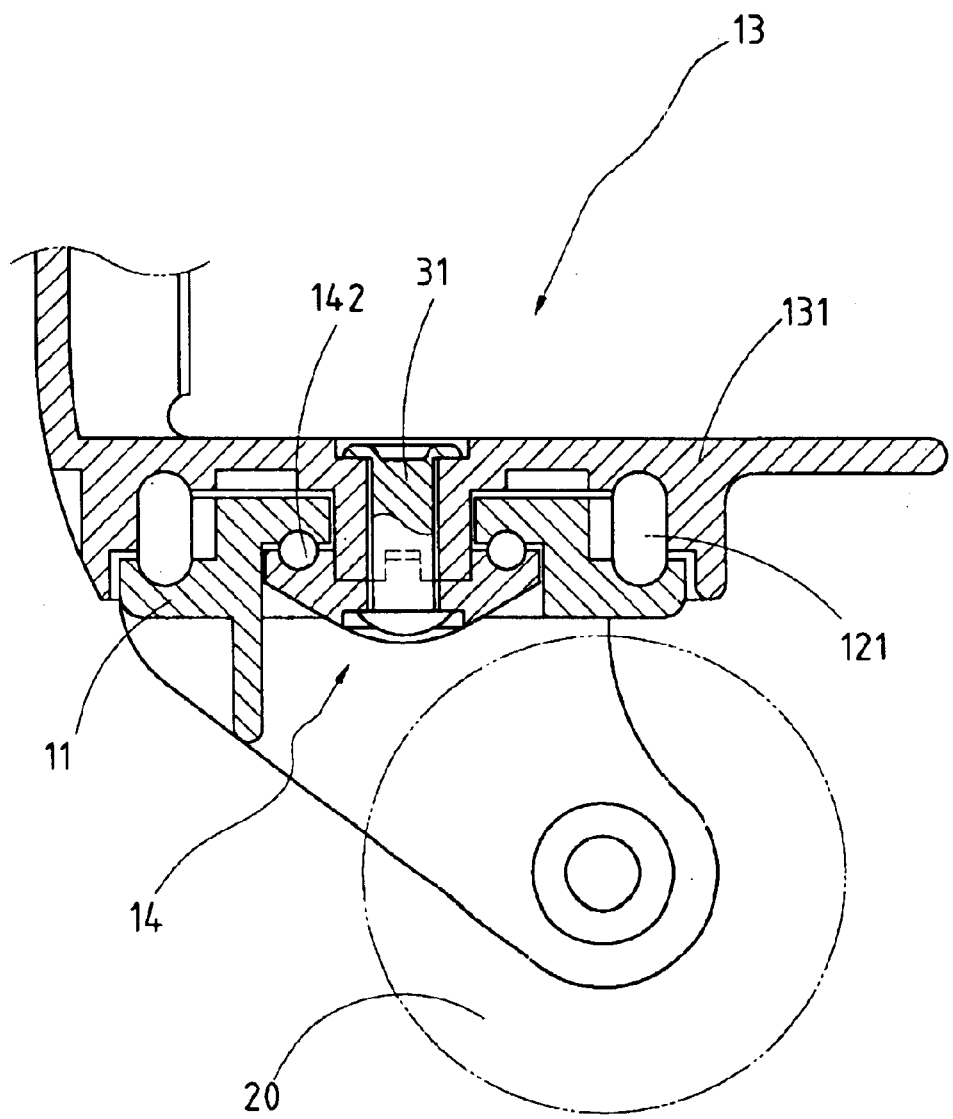
FIG. 4 shows a sectional schematic view of the present invention at work.

As shown in FIGS. 1–4, a caster structure 10 embodied in the present invention comprises a wheel frame 11, a roller bearing 12, a mounting plate 13, and a locating member 14.

The wheel frame 11 is of an inverted U-shaped construction and is provided in the crown portion thereof with a through slot 111 which is in turn provided in the inner wall with a stop edge 112.

The roller bearing 12 has a plurality of rollers 121 which are circularly arranged in the inner wall of a holder 122. The holder 122 is disposed in the through slot 111 of the wheel frame 11 such that the holder 122 is stopped by the stop edge 112 of the through slot 111.

The mounting plate 13 is provided in the upper side with a fastening portion 131 by which the mounting plate 13 is fastened to a leg, bottom corner, or the like of a piece of furniture or other object. The mounting plate 13 is provided with a through hole 132 and a locating portion 133 extending from the underside of the mounting plate 13 such that the locating portion 133 is corresponding in location to the through hole 132.

The locating member 14 is provided with a fastening hole 141 and a plurality of rollers 142 which are arranged circularly in the upper side of the locating member 14. The locating member 14 is used to locate the wheel frame 11 in conjunction with a locating bolt 31 such that the locating member 14 is disposed under the stop edge 112 of the through slot 111 of the wheel frame 11, and that the rollers 142 are in contact with the underside of the stop edge 112, and further that the locating member 14 and the wheel frame 11 are fastened to the locating portion 133 of the mounting plate 13 by the fastening bolt 31 which is engaged with a nut via the fastening hole 141 of the locating member 14. The nut is engaged with the locating bolt 31 via the through hole 132 of the mounting plate 13.

A wheel 20 is fastened pivotally to the wheel frame 11 in conjunction with a bolt 30, a bearing 21, a bearing housing 22, and two protective covers 23. When the wheel 20 is turned in a direction, the rollers 121 of the roller bearing 12 and the rollers 142 of the locating member 14 move to reduce friction.

The roller bearing 12 is made of an industrial rubber or plastic material in place of metal.

The rollers 121 of the roller bearing 12 may be circularly arranged in the outer wall of the holder 122.

The embodiment of the present invention described above is illustrative and nonrestrictive. Accordingly, the present invention may be embodied in other specific forms without deviating from the spirit thereof. The present invention is therefore to be limited only by the scopes of the following claims.

I claim:

1. A caster assembly for fastening an object comprising:

a mounting plate having a locating portion extending from an underside thereof, said mounting plate having a fastening means on an upper side thereof, said fastening means for fastening said mounting plate to a bottom of the object;

a wheel frame of an inverted U-shaped construction, said wheel frame having two arms with a crown portion connecting said two arms, said crown portion being fastened to said locating portion of said mounting plate, said crown portion having a through slot, said through slot having an inner wall and a stop edge, said stop edge extending inwardly from said inner wall at an acute angle;

a roller bearing having an annular holder with a plurality of vertically oriented rollers arranged circularly along an inner wall of said holder, said holder being disposed in said through slot of said crown portion of said wheel frame, said holder being stopped by said stop edge;

a locating member having an upper surface with an plurality of rollers arranged circularly at an acute angle to a horizontal plane on said upper surface, said plurality of rollers of said locating member bearing against an underside of said stop edge, said locating member having a fastening hole and a locating bolt, said locating bolt fastening said crown portion of said wheel frame with said locating portion of said mounting plate such that said locating member is disposed under said stop edge, said locating bolt being engaged with said locating portion of said mounting plate through said fastening hole of said locating member and said holder; and a wheel rotatably mounted to said wheel frame.

2. The caster assembly of claim 1, said rollers of said roller bearing being arranged circularly on an outer wall of said holder.

* * * * *